United States Patent [19]
Park et al.

[11] Patent Number: 5,359,462
[45] Date of Patent: Oct. 25, 1994

[54] DEVICE FOR ELIMINATING NOISES DURING SLOW AND HIGH SPEED SEARCH OPERATION IN A VIDEO TAPE RECORDER AND METHOD THEREFOR

[75] Inventors: Chan-Young Park, Seoul; Kye-Jong Kim, Suwon-city, both of Rep. of Korea

[73] Assignee: SamSung Electronics Co., Ltd., Suwon, Rep. of Korea

[21] Appl. No.: 820,072

[22] Filed: Jan. 13, 1992

[30] Foreign Application Priority Data

Mar. 30, 1991 [KR] Rep. of Korea ............... 1991-5096

[51] Int. Cl.⁵ .................. H04N 5/78; G11B 15/14
[52] U.S. Cl. .................. 360/10.2; 360/10.3; 360/64
[58] Field of Search ........ 360/10.2, 10.1, 11.1, 360/10.3, 64, 33.1, 72.2; 358/310, 312, 313, 335

[56] References Cited

U.S. PATENT DOCUMENTS

| | | | |
|---|---|---|---|
| 4,439,791 | 3/1984 | Hirata | 360/10.2 X |
| 4,707,749 | 11/1987 | Nishijima et al. | 360/72.2 X |
| 4,887,169 | 12/1989 | Bannai et al. | 360/64 X |
| 4,905,108 | 2/1990 | Otokawa | 360/10.2 X |

*Primary Examiner*—Aristotelis Psitos
*Assistant Examiner*—Jennifer Pearson
*Attorney, Agent, or Firm*—Robert E. Bushnell

[57] ABSTRACT

A device for reproducing a picture without noises in slow and/or high speed search modes of operation and a method therefor. The device records an address indicative of tape position on a control track of a video tape, the address being comprised of a single address block; jumps over a certain number of the addresses when operating in the slow mode of operation, to perform accurate tracking and thereafter reading picture data, records the picture data in a memory, and reproduces the picture data repeatedly during jumping over the certain number of addresses; switches successively the heads substantially at ¼ and ¾ positions of a full control tracking time when operating in the high speed search mode of operation, thereby recording the picture data in the memory so as to form a complete picture of one frame to be reproduced.

15 Claims, 6 Drawing Sheets

DEVICE FOR ELIMINATING NOISES DURING SLOW AND HIGH SPEED SEARCH OPERATION IN A VIDEO TAPE RECORDER AND METHOD THEREFOR

FIELD OF THE INVENTION

This invention relates to a device and method for eliminating noises during slow and/or high speed search modes of operation in a video tape recorder (hereinafter called a VTR for short), and more particularly although not exclusively to a device and method for eliminating noises during slow and/or high speed search mode of operation by utilizing an address code of tape location recorded on a control track of a tape.

TECHNICAL BACKGROUND OF THE INVENTION

Generally, speed of a head drum motor of a household VTR is set to 1,800 rpm and further, the tape running speed becomes 33 mm per second. A running length of a tape which is sloped towards a direction of rotation of the head drum is 33 mm/30 rounds=1.1 mm/round because the drum rotates at a speed of 30 rounds per second. A track that is 58 $\mu$m wide has a format as shown in FIG. 1 and a gradient of 6° in the tape running direction. Accordingly, a tape length 'L' of each track, in the tape running direction, is about 554.8 $\mu$m from a formula L=58 $\mu$m/Cos 84°. Thus, a tape length of two tracks is 554.8 $\mu$m×2=1100 $\mu$m=1.1 mm because the head drum reads two tracks per round and this length is equal to the length inclined to a direction of rotation of a head.

Because the head reads a tape from a lower end of a first track to an upper end of a second track when the tape is stopped as shown in FIG. 1, data of a central portion of the tracks may be lost and accordingly a noise bar appears on a central portion of a picture during the display of the picture of poor quality.

In a high speed search mode of operation, a tape running speed becomes fast, so that a tracking trace of the head drum will stand up with respect to a direction of the tape width and consequently the head is tracking three to four tracks per round. Accordingly, may appear three or four noise bars on the screen, resulting in a poor picture quality when reproducing.

For solving the above mentioned problems, there is introduced a method of automatic tracking for jumping over a track by actuating a capstan motor when reproducing a picture. However, it is difficult to embody the method because of the difficulties in controlling a servo.

In the high speed search mode of operation, it is, however, possible to search for a tape location quickly by utilizing an address code which indicates the tape location, recorded on a control track of a VTR tape.

As shown in FIG. 4, the address signal includes three identical address blocks, each block consisting of twenty seven bits. Further, the respective blocks have a header code of eleven bits and an address code of sixteen bits. Every bit is matched with a video track, and a head drum having two channels and four heads is used during recording. Herein, four tracks make one field and eight tracks make one frame. The three address blocks consist of eighty one tracks, which corresponds to the addresses for about ten frames.

The reason why one address signal includes the three identical address blocks as mentioned above is to solve the problem that the head drum is not able to read the address accurately due to the high tape speed during the high speed search mode of operation. However, a recent rapid development in electronic engineering makes it possible for the head drum to read the address efficiently even if the address includes only one address block. Therefore, it is uneconomical to record the same three address blocks in one address in consideration of utilizing the tape.

SUMMARY OF THE INVENTION

An object of this invention is accordingly to provide a device for reproducing a picture without noises in slow and/or high speed search modes of operation and a method therefor.

Another object of this invention is to provide a device for controlling the movement of a VTR tape according to an address signal recorded on a control track of a tape, wherein the recorded signal during the stoppage of the tape is reproduced repeatedly to generate the recorded signal during the movement of the tape.

According to the present invention, a method for eliminating noises during slow and/or high speed search modes of operation in a video tape recorder includes: recording an address indicative of tape position on a control track of a video tape, the address being comprised of a single address block; jumping over a certain number of the addresses when operating in the slow mode of operation, to perform accurate tracking and thereafter to read picture data, recording the picture data in a memory, and reproducing the picture data repeatedly during jumping over the certain number of addresses; switching successively the heads substantially at $\frac{1}{4}$ and $\frac{3}{4}$ positions of a full control tracking time when operating in the high speed search mode of operation, thereby recording the picture data in the memory so as to form a complete picture of one frame to be reproduced.

The present invention will now be described more specifically with reference to the accompanying drawings only by way of example.

BRIEF DESCRIPTION OF THE ACCOMPANYING DRAWINGS

DETAILED DESCRIPTION OF CERTAIN PREFERRED EMBODIMENT

Figure 6:
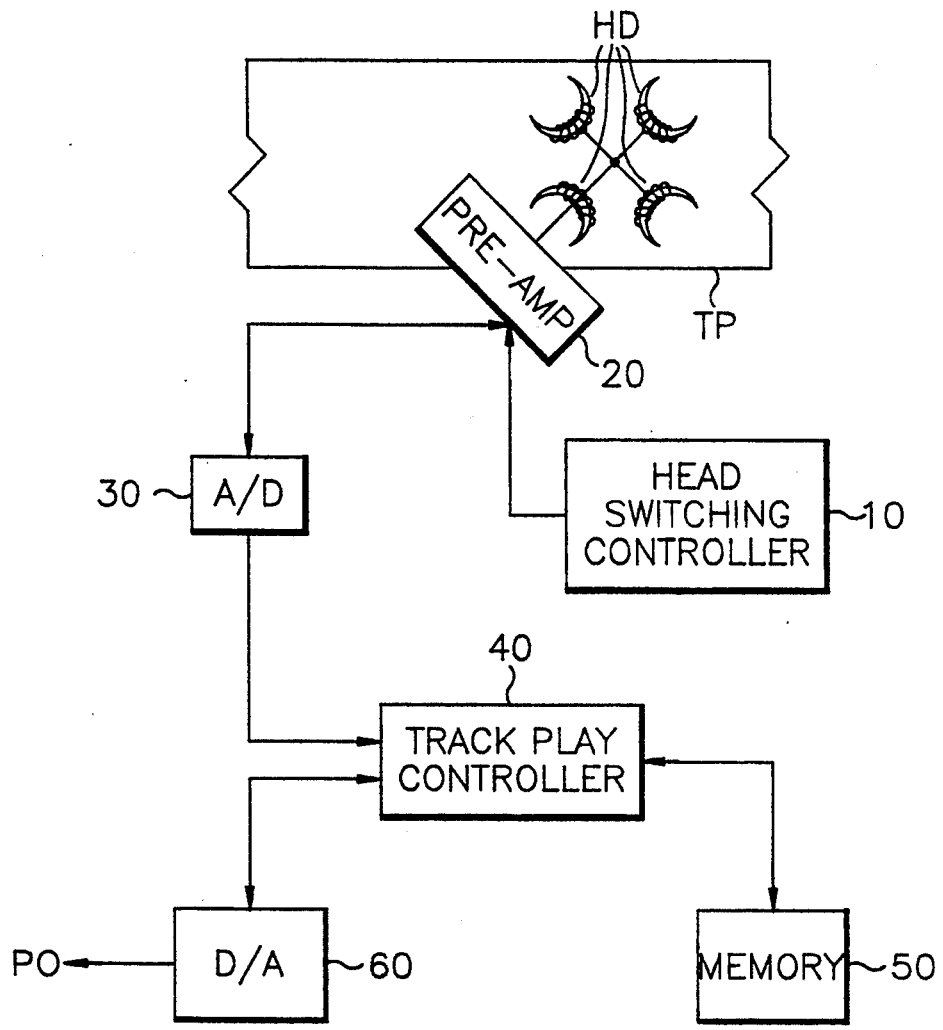
FIG. 6 is a view of a system block diagram according to the present invention.

Referring to FIG. 6, a device for reproducing a picture without noises in slow and/or high speed search modes of operation includes a head HD for recording and reproducing an address signal and a picture signal on and from the tape and a preamplifier 20 for amplifying a weak signal reproduced from the head HD. An analog-to-digital (A/D) converter 30 converts the analog signal amplified from the preamplifier 20 into a digital signal. A head switching controller 10 controls a switching operation of the head HD. A track play controller 40 records data supplied from the A/D converter 30 to a memory 50 and generates the data store in memory 50 while the data is not supplied from the A/D converter 30. A digital-to-analog (D/A) converter 60 converts a digital signal output from the track play controller 40 into an analog signal so as to generate the reproduced picture signal.

The device and method according to the present invention may be adapted effectively to a VTR system having a head drum with two channels and four heads, and to a tape having a recording/reproducing format with four tracks per field and eight tracks per frame. In such a system, a motor speed is generally 3,600 rpm, equivalent to 60 rps, and one round of the head drum is equivalent to four tracks, i.e., one field.

Figure 4:
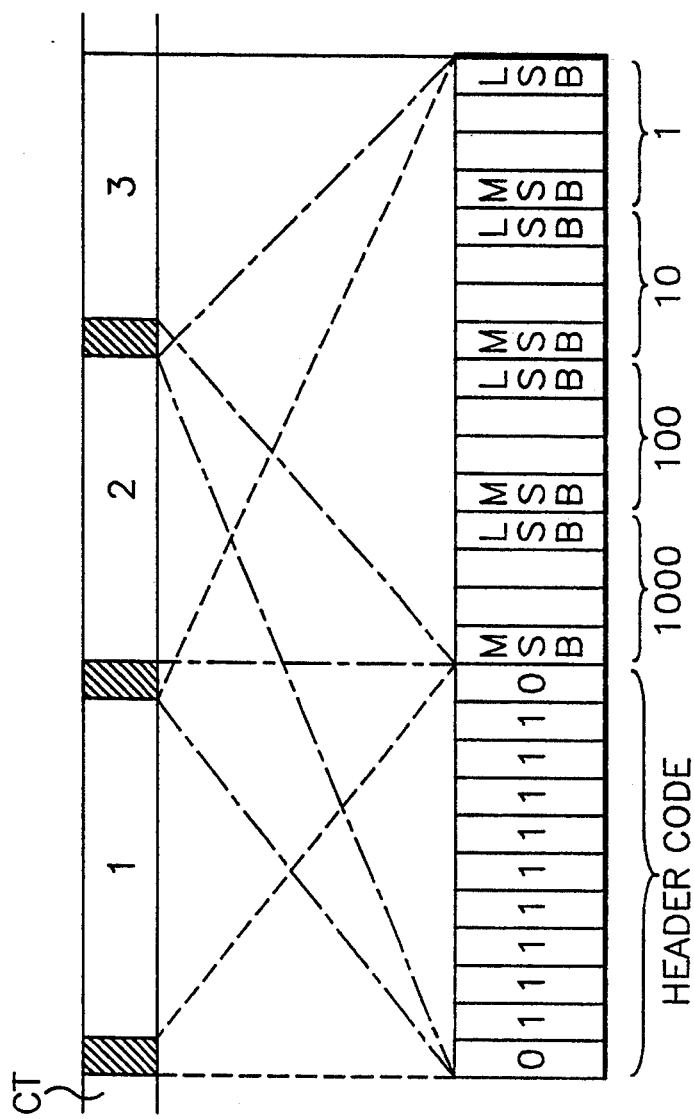
FIG. 4 is a view of a conventional address format.
Figure 5:
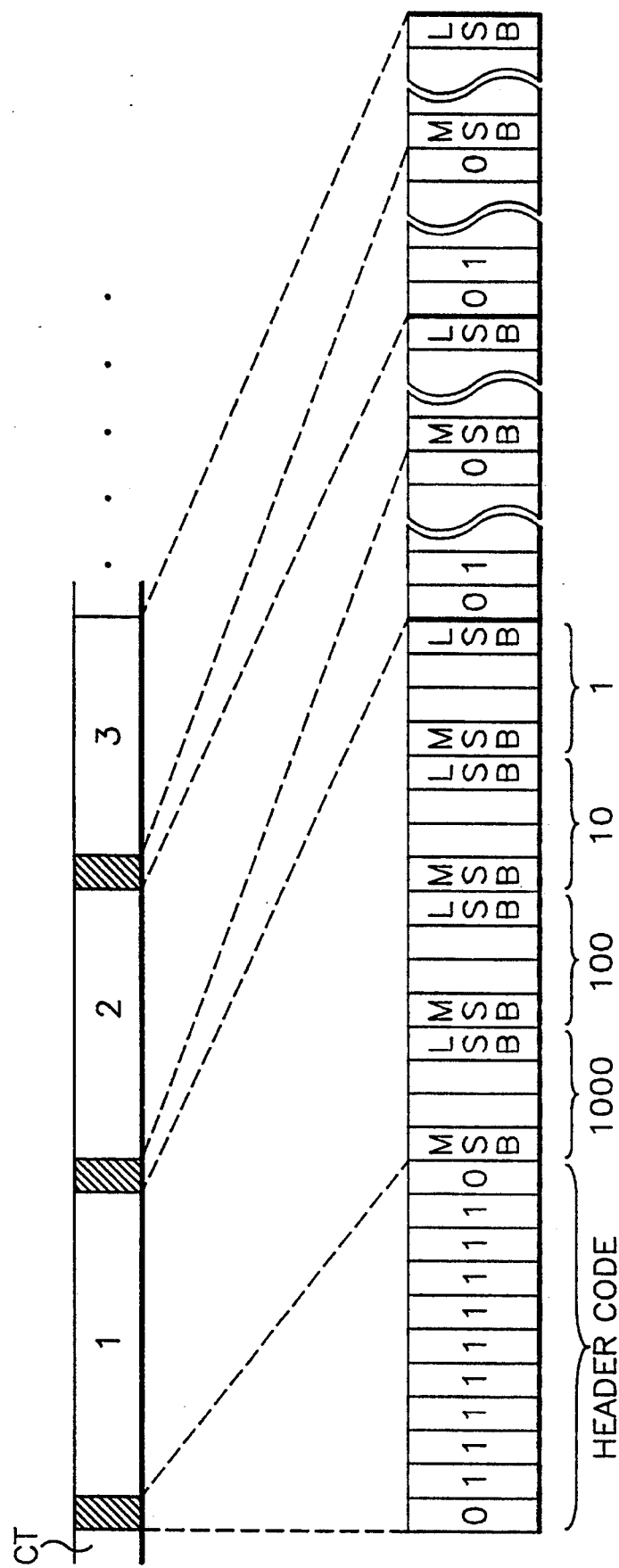
FIG. 5 is a view of an address format according to the present invention.

As described before, in the prior art address format of FIG. 4, one address block includes twenty seven bits and three identical blocks make one address. On the contrary, however, in the present invention, as shown in FIG. 5, every address block has twenty seven bits and each address block has its own address.

Accordingly, in contradistinction to the prior art in which no more than 9,999 addresses i.e., from 0000 to 9999, are available to be addressed, three times the number of available addresses, i.e., 9999×3=29,997 addresses, are available to be addressed in the device and method according to the present invention.

The device shown in FIG. 6 performs an automatic tracking under the address format being configured as described above. If the tape skips over every three address positions during movement of the tape, the head drum repeats three times an automatic tracking during the stoppage of the tape, so as to carry out a proper tracking and thereafter, reads out the picture data at a fourth address.

Figures 7A, 7B, 7C:
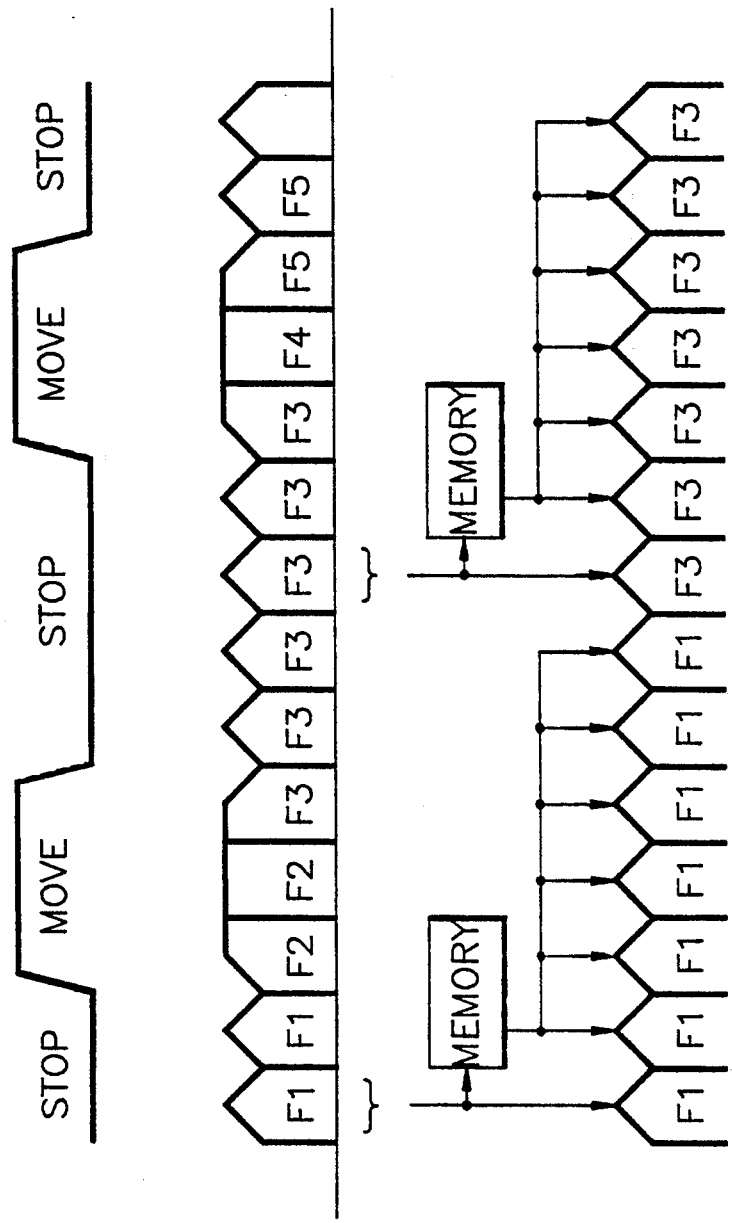
FIGS. 7A through 7C are views of a read/write format of a memory during a slow speed search mode of operation according to the present invention.

Referring to FIGS. 7A through 7C, the track play controller 40 records the third signal output from the A/D converter 30 to the memory 50 when a travelling interval of FIG. 7A is in a low state, i.e., stationary state, and generates repeatedly the signal recorded in the memory 50 as a picture data until the address reaches a coming third address.

Therefore, it is possible to display a slow motion without noises if such procedure is performed for a given period at a speed lower than the speed of the normal play mode of operation.

In the high speed search mode of operation, however, it may be impossible to perform the automatic tracking because the tape running speed is faster than that of the normal play mode of operation.

Figure 1:
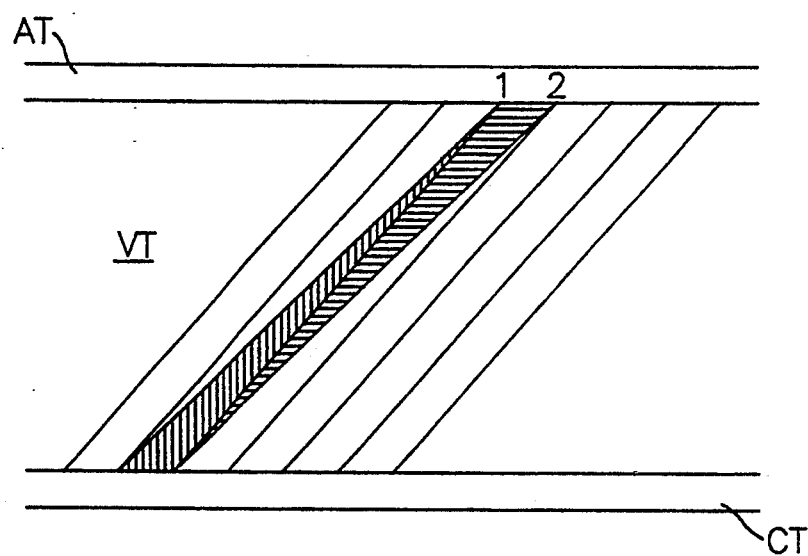
FIG. 1 is a view of the format of a general VTR tape.
Figure 2:
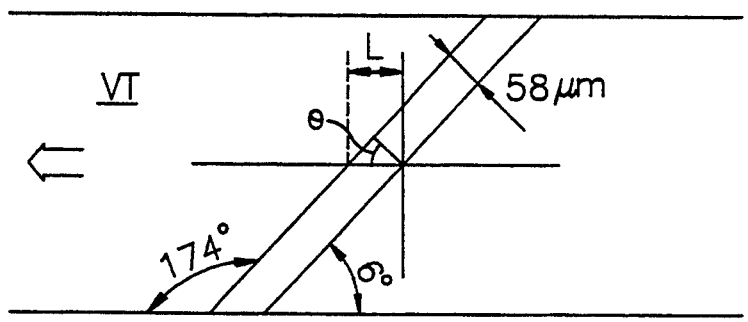
FIG. 2 is a view of a gradient of a track when a VTR tape is not running.
Figure 3:
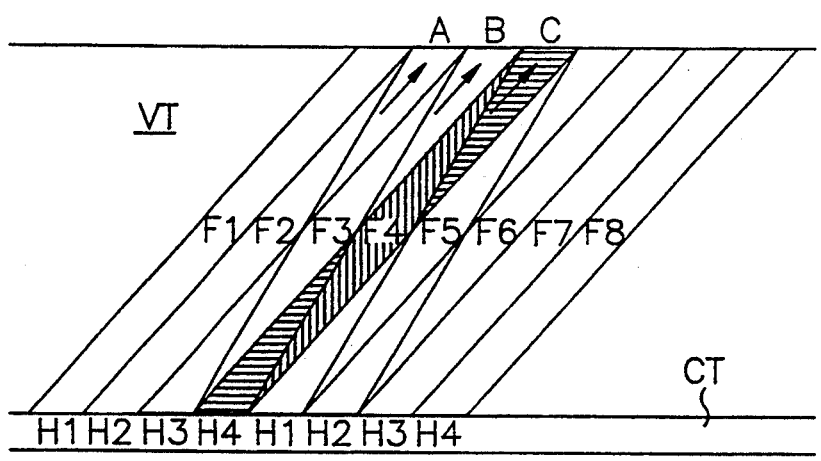
FIG. 3 is a view of a scan format of a head during a high speed search mode of operation.

Accordingly, as shown in FIG. 3, the first to fourth heads H1, H2, H3, H4 are so arranged to scan corresponding tracks F1, F2, F3, F4, respectively and again the heads H1 through H4 scan the next corresponding tracks F5 through F8. When scanning in a direction of arrow 'A' during the high speed search mode of operation, the fourth head H4 is switched off at a position of a one fourth of track width. Similarly, the first head H1 is switched on at a position of one fourth of a track width to read the data and switched off at a position of three fourths of the track width, when scanning in a direction of arrow 'B'. Successively, the second head H2 is switched on at a position of three fourths of the track width and switched off at a position of four fourths of the track width, when scanning in a direction of arrow 'C'.

Figures 8A, 8B:
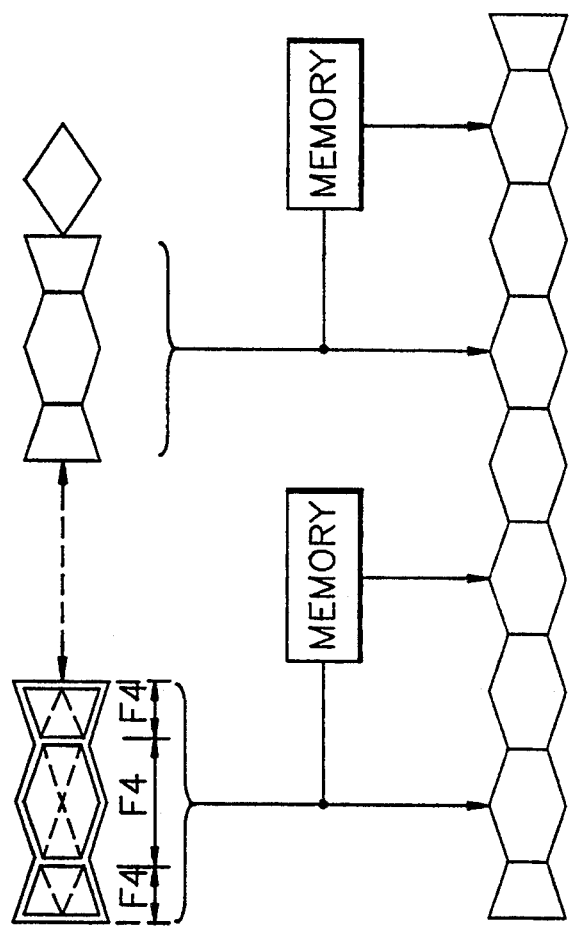
FIGS. 8A and 8B are views of a read/write format of a memory during a high speed search mode of operation according to the present invention.

Each picture data read in the above mentioned procedure is illustrated in FIG. 8A. The track play controller 40 records the data successively in the memory 50, and reads out the data from the memory 50 to form therefrom a picture data of one track. By repeating the above procedure of reproducing picture data for the next interval, the picture may carry only two partial noise bars on the screen, which is a picture of much higher quality.

In a high speed search mode of operation, it is also possible to reproduce a good picture without noises by repeating the above operations at every eighth track.

As described in the above, the present invention may record the address three times more densely on the control track of the VTR tape, compared with the conventional device and method. Furthermore, the device according to the present invention jumps over a certain interval and stops repeatedly, to thereby perform various slow modes of operation without noises. More specifically, in doing so, noises may be greatly reduced during reproducing a picture in the slow mode of operation. It is also possible to get a picture of good quality in a high speed search mode of operation.

While the invention has been particularly shown and described with reference to a preferred embodiment, it will be understood by those skilled in the art that modifications in detail may be made without departing from the spirit and scope of the invention.

What is claimed is:

1. A method of providing slow and/or high speed search modes of operation in a video tape recorder having a head drum mounting a plurality of heads, comprising the steps of:
    recording addresses indicative of tape position on a control track of a video tape, each of said addresses comprising a single address block;
    jumping over a given number of said addresses when operating in the slow speed search mode of operation, to perform tracking and thereafter reading said picture data, recording the picture data in a memory, and reproducing said picture data from said memory repeatedly during said jumping over of said given number of addresses; and
    switching on and off, successively, a first plurality of said plurality of heads substantially at $\frac{1}{4}$ and $\frac{3}{4}$ positions of a full control tracking time when operating in the high speed search mode of operation to produce a continuous sweep across a recorded track of said picture data, recording the picture data in the memory to form a complete picture of one frame to be reproduced, and reading the picture data from the memory.

2. A device for providing slow and/or high speed search modes of operation during reproducing of a picture signal recorded on a video tape, comprising:
    head means for reproducing and recording said picture signal respectively from and to the video tape, and for reproducing and recording an address signal from and to a control track of the video tape;
    amplification means coupled to said head means for amplifying said picture signal and said address signal reproduced from said head means to generate an analog signal with a picture component and an address component;

analog-to-digital converter means for converting said analog signal output from said amplification means into a first digital signal;

head switching controller means for controlling a switching operation of said head means, according to the mode of operation, said head switching controller means switching on and off, successively, a first plurality of a plurality of heads substantially at ¼ and ¾ positions of a full control tracking time to produce a continuous reproducing sweep across a recorded track of said picture signal when operating in the high speed search mode of operation;

memory means for storing said first digital signal and generating a second digital signal corresponding to said first digital signal;

track play controller means coupled between said analog-to-digital converter means and said memory means, for delivering said first digital signal from said analog-to-digital converter means to said memory means and reproducing said second digital signal stored in said memory means; and digital-to-analog converter means coupled to said track play controller means, for converting said second digital signal output from said track play controller means into a reproduced picture signal.

3. The device as claimed in claim 2, wherein said track play controller means reproduces said second digital signal from said memory means when said analog-digital converter means does not supply said first digital signal to said track play controller means.

4. The device as claimed in claim 3, wherein said head means comprises:

four heads for recording said picture signal on the video tape, and for reproducing said picture signal from the video tape.

5. The device as claimed in claim 4, wherein four tracks on the video tape correspond to a field and eight tracks correspond to a frame.

6. A method of reproducing picture data recorded on a video tape during a slow speed and high speed search mode of said video tape, comprising the steps of:

recording addresses indicative of video tape position on a control track of the video tape;

reading said picture data, located at a given address, from the video tape;

storing said picture data to produce a stored signal;

skipping a plurality of addresses and displaying said stored signal during said step of skipping a plurality of said addresses;

reading new picture data from the video tape; and switching on and off, successively, a first plurality of a plurality of heads substantially at ¼ and ¾ positions of a full control tracking time to produce a continuous reproducing sweep across a recorded track of said picture data when operating in the high speed search mode of operation, recording the picture data in the memory to form a complete picture of one frame to be reproduced, and reading out the picture data from the memory.

7. A method of successively activating and deactivating a plurality of reproducing heads to produce a continuous reproduction sweep across a track of picture data recorded on a video tape for reproducing picture data recorded on said video tape during a high speed search of said video tape, comprising the steps of:

switching a first head on;

reading a first portion of said picture data recorded on a first track of the video tape using said first head for substantially one quarter of said first track width;

switching said first head off;

switching a second head on;

reading a second portion of said picture data recorded on said first track of the video tape using said second head for substantially one half of said first track width;

switching said second head off;

switching a third head on;

reading a third portion of said picture data recorded on said first track of the video tape using said third head for substantially one quarter of said first track width;

switching said third head off;

successively storing in a memory said picture data read by said first, second and third heads; and successively reading said picture data stored in the memory.

8. The device as claimed in 2, wherein said head means skips over a plurality of addresses of the video tape, represented by said address signal, and said head means is controlled to allow an automatic tracking head means, mounted on said head means, to be in line with a tracking trace of the video tape.

9. The device as claimed in 5, wherein said head means skips over a plurality of addresses represented by said address signal on the video tape, and controlling said head means to allow means mounted on said head means for automatically tracking said head means, to be in line with a tracking trace of the video tape.

10. The device as claimed in claim 9, wherein during the high speed search mode, a first head of said four heads scans the video tape for substantially one quarter of a first track width of a first track, a second head of said four heads scans the video tape for substantially one half of a second track width of a second track, and a third head of said four heads scans the video tape for substantially one quarter of a third track width of a third track, said first track being adjacent to said second track and said second track being adjacent to said third track.

11. The device as claimed in claim 8, wherein each one of said addresses has only one address block.

12. The device as claimed in claim 10, wherein each one of said addresses has only one address block.

13. A method of reproducing picture data recorded on a video tape in slow and high speed search modes of operation in a video tape recorder having a head drum mounting a plurality of heads, comprising the steps of:

recording addresses indicative of tape position on a control track of said video tape, each of said addresses comprising a single address block;

jumping over some of said addresses when operating in the slow speed search mode of operation, to perform tracking and thereafter reading picture data, recording the picture data in a memory, and reproducing said picture data repeatedly during said jumping over said addresses; and switching on and off a first plurality of said plurality of heads successively, substantially at ¼ and ¾ positions of a full control tracking time to produce a continuous reproducing sweep across a recorded track of said picture data when operating in the high speed search mode of operation, successively recording the picture data in the memory to form a complete picture of one frame to be reproduced, and successively reading the picture data from the memory.

14. A device for reproducing a picture signal recorded on a video tape in slow and high speed modes of operation, comprising:
- head means for reproducing and recording said picture signal respectively from and to the video tape, and for reproducing and recording an address signal indicating addresses of tracks of said picture signal respectively from and to a control track of the video tape;
- amplification means coupled to said plurality of head means, for generating amplified picture data and amplified address information by amplifying said picture signal and said address signal reproduced from said head means;
- head switching controller means for controlling a switching operation of said head means in accordance with the slow and high speed modes of operation, said head switching controller means switching on and off, successively, a first plurality of a plurality of heads substantially at $\frac{1}{4}$ and $\frac{3}{4}$ positions of a full control tracking time to produce a continuous reproducing sweep across a recorded track of said picture signal when operating in the high speed search mode of operation;
- memory means for storing said amplified picture data; and
- track play controller means for successively delivering said amplified picture data to said memory means and successively reading out said amplified picture data from said memory means during the high speed mode, and for delivering said amplified picture data to said memory means while said head means reads one of said addresses from the control track, and for reading the amplified picture data repeatedly while said head means jumps over a plurality of said addresses.

15. A method of successively activating and deactivating a plurality of reproducing heads to produce a continuous reproduction sweep across a track of picture data recorded on a video tape medium for reproducing picture data recorded on said video tape during a high speed search of said video tape, comprising the steps of:
- reading a first portion of said picture data recorded on a first track of the video tape using a first head for substantially one quarter of a track width of said first track;
- reading a second portion of said picture data recorded on said first track of the video tape using a second head for substantially one half of said track width of said first track;
- reading a third portion of said picture data recorded on said first track of the video tape using a third head for substantially one quarter of said track width of said first track;
- successively storing in a memory said picture data read by said first, second and third heads; and
- successively reading said picture data stored in the memory.

* * * * *

UNITED STATES PATENT AND TRADEMARK OFFICE
CERTIFICATE OF CORRECTION

PATENT NO. : 5,359,462

DATED : 25 October 1994

INVENTOR(S) : Chan-Young PARK and Kye-Jong KIM

It is certified that error appears in the above-indentified patent and that said Letters Patent is hereby corrected as shown below:

Column 1, line 13, change "mode" to --modes--;

line 44, delete "may appear", and line 45, after "bar", insert --may appear--.

Column 3, line 7, change "store" to --stored--, line 63, delete "a", and after "of" insert --a--.

Signed and Sealed this

Fourth Day of July, 1995

Attest:

BRUCE LEHMAN

Attesting Officer

Commissioner of Patents and Trademarks